United States Patent [19]
Winston, Jr. et al.

[11] Patent Number: 5,410,149
[45] Date of Patent: Apr. 25, 1995

[54] OPTICAL OBSTRUCTION DETECTOR WITH LIGHT BARRIERS HAVING PLANES OF LIGHT FOR CONTROLLING AUTOMATIC DOORS

[75] Inventors: Charles R. Winston, Jr.; Walter J. Wiegand, both of Glastonbury, Conn.

[73] Assignee: Otis Elevator Company, Farmington, Conn.

[21] Appl. No.: 91,799

[22] Filed: Jul. 14, 1993

[51] Int. Cl.⁶ .................. G01V 9/04; G06M 7/00; H01J 40/14
[52] U.S. Cl. .................................. 250/221; 340/556
[58] Field of Search ............... 250/221, 341; 356/240; 340/555, 556, 557; 187/103, 104

[56] References Cited

U.S. PATENT DOCUMENTS

| | | | |
|---|---|---|---|
| Re. 33,668 | 8/1991 | Gray | 250/221 |
| 3,534,499 | 10/1970 | Chaffee | 49/25 |
| 3,691,556 | 9/1972 | Bloice | 343/5 PD |
| 3,796,208 | 3/1974 | Bloice | 128/2 R |
| 4,506,765 | 3/1985 | Payne et al. | 187/29 R |
| 4,823,010 | 4/1989 | Kornbrekke et al. | 250/341 |
| 4,858,156 | 8/1989 | Martin | 364/560 |
| 4,967,083 | 10/1990 | Kornbrekke et al. | 250/341 |
| 5,001,557 | 3/1991 | Begle | 358/113 |
| 5,075,632 | 12/1991 | Payne et al. | 328/5 |
| 5,142,152 | 8/1992 | Boiucaner | 250/341 |

*Primary Examiner*—David C. Nelms
*Assistant Examiner*—Steven L. Nicholas
*Attorney, Agent, or Firm*—Joseph P. Abate

[57] ABSTRACT

An obstruction detection system includes emitters, a sensor, and obstruction detection circuitry. The emitters mounted along the top of an opening radiate a plane of light toward the floor. The plane of light intersects the floor and creates a floorline at the intersection of the plane of light and the floor. The plane of light also intersects the door edge and creates a door edge line at the intersection of the door edge and the plane of light. A sensor, located outside the plane of light, monitors the opening so that the presence of the obstruction can be detected from a change in a received light pattern of the floorline, the door edge line, and from reflections from an obstruction in the plane of light. The sensor provides an output signal in response to the received light pattern to a means for analyzing said sensor output signal for obstruction detection.

14 Claims, 6 Drawing Sheets

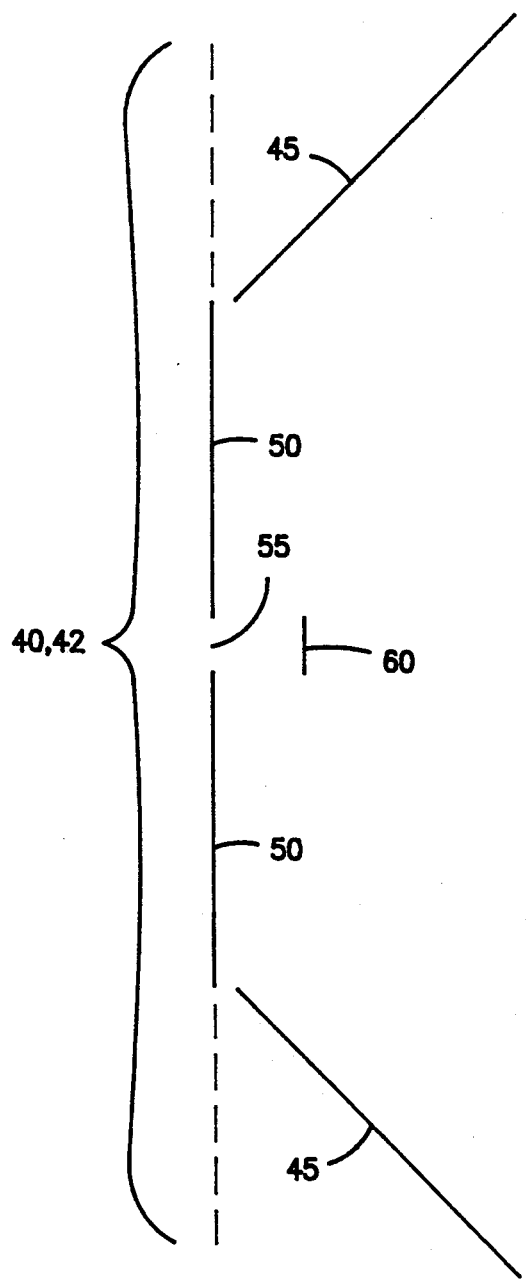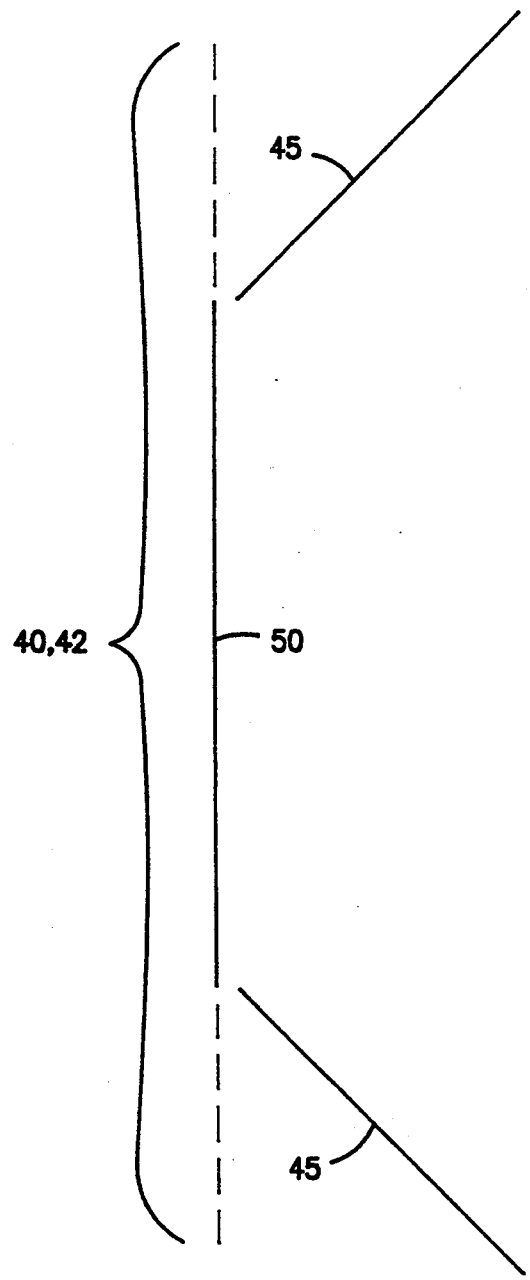
*FIG-4*          *FIG-3*

OPTICAL OBSTRUCTION DETECTOR WITH LIGHT BARRIERS HAVING PLANES OF LIGHT FOR CONTROLLING AUTOMATIC DOORS

TECHNICAL FIELD

This invention relates to the detection of an object within a defined space, in particular, a doorway such as an elevator car doorway.

BACKGROUND OF THE ART

In elevators it is common to use one or more automatic sliding doors. Systems are used to detect the presence of an obstruction between the doors before and during closure for the protection of the passengers. Typically the systems, in the event of an obstruction, prevent the elevator doors from closing further and, preferably, reopen them.

One known system for detecting objects in the path of elevator doors places a light beam in a path across the door opening and uses a sensor to detect an interruption of the light beam, which would occur if an obstruction is between the door. Upon sensing the interruption, the sensor issues a signal to alter the control of the door operation, and preferably reopen the doors.

The system has an array of light sources disposed vertically on one side of the door, producing light beams, and a corresponding array of photosensitive detectors arranged on the other door, for sensing those light beams, thus creating a system which can sense objects at different heights in the doorway.

This system, although generally satisfactory, has the disadvantage of only having the ability to detect objects which penetrate in or about the mid-plane of the doorway. For example, objects such as fingers on the edge of the door, which are in the volume swept by the closing doors but do not extend into the light path, will go undetected. This depth detection problem could be improved, for instance, by mounting emitters and detectors on both edges of the doors. However, the additional emitters and detectors, disposed to the elevator car doors and/or disposed to the hoistway doors, would significantly add to the cost and the complexity of the detection system.

DISCLOSURE OF THE INVENTION

It is an object of the present invention to provide obstruction sensing in an opening, such as a doorway, which supplies substantially complete coverage of a path swept by closing doors.

According to the present invention, for detecting an obstruction in an opening, a plurality of emitters mounted along the top of the opening radiates a plane of light toward the floor. The plane of light intersects the floor and creates a floorline at the intersection of the plane of light and the floor. The plane of light also intersects the door edge and creates a door edge line at the intersection of the door edge and the plane of light. A sensor, located outside the plane of light, monitors the opening so that the presence of the obstruction can be detected from a change in a received light pattern of the floorline, the door edge line, and from a reflection of the obstruction in the plane of light. The sensor provides an output signal in response to the received light pattern to a means for analyzing said sensor output signal for obstruction detection. Further according to the present invention, the means for analyzing the output signal for obstruction detection may be implemented by various electronic circuit arrangements.

Among the advantages of the present invention is providing the ability to detect objects within the substantially complete area of the opening by radiating a plane of light on the edges of the area of the opening. This provides the advantage of detecting obstructions which may not be detected by a system which uses light beams. For example, the present invention provides the ability to detect obstructions such as fingers on the edge of the opening, which are in the volume of the opening but do not extend into the beam path of the system which uses light beams.

The foregoing and other objects, features and advantages of the present invention will become more apparent in light of the following detailed description and accompanying drawings.

BRIEF DESCRIPTION OF THE DRAWINGS

FIG. 3 shows the pattern of light in an unobstructed scene as observed by the sensor;

FIG. 4 shows the pattern of light in an obstructed scene as observed by the sensor;

BEST MODE FOR CARRYING OUT THE INVENTION

Figure 1:
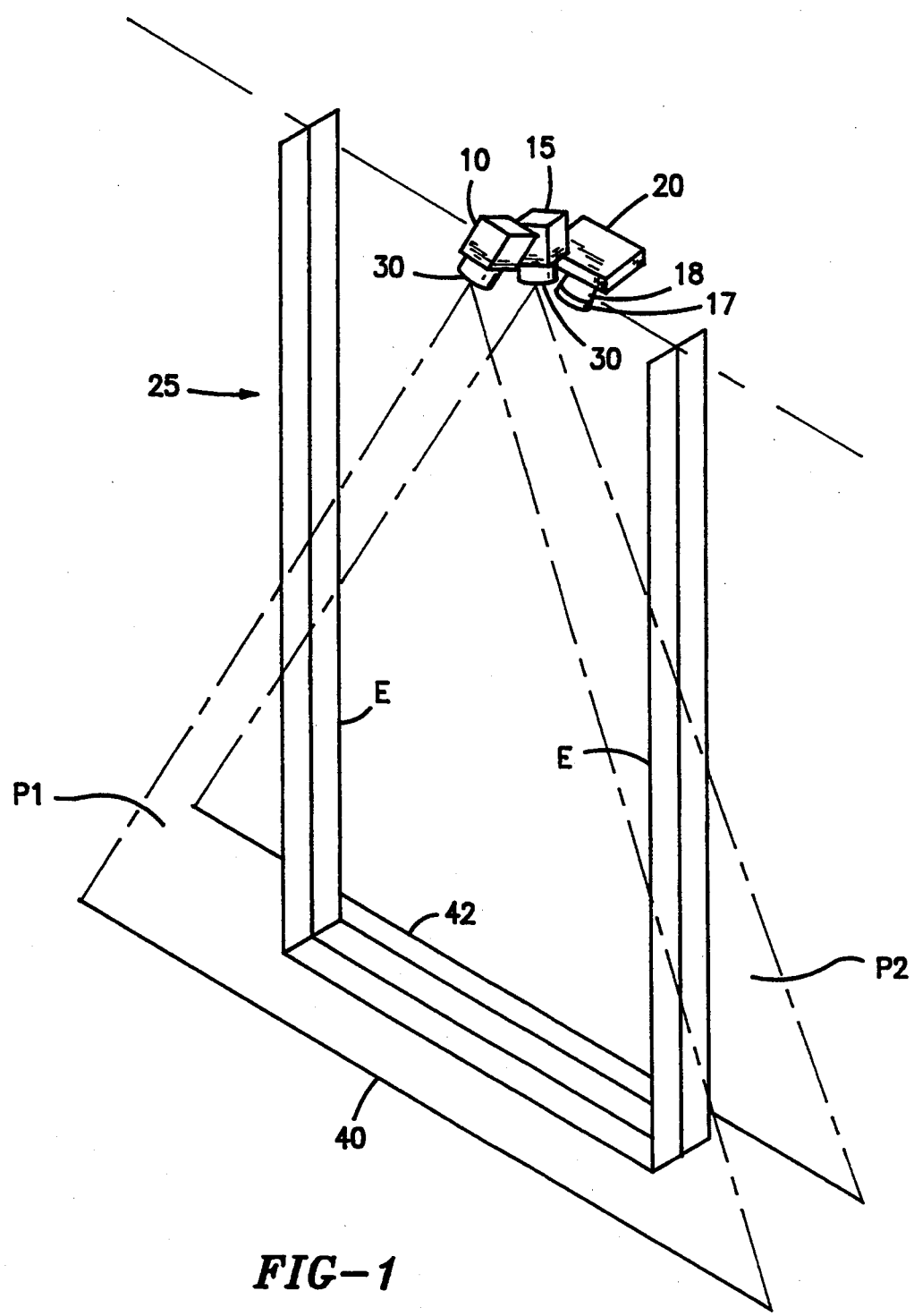
FIG. 1 is a perspective view of an elevator doorway employing the present invention.
Figure 2:
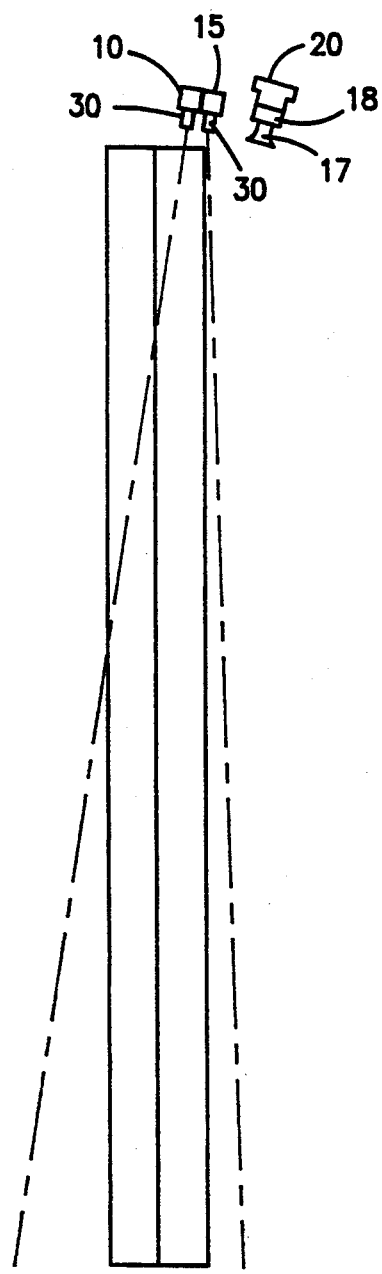
FIG. 2 is a side view of an elevator doorway employing the present invention.

In FIGS. 1 and 2, a plurality of emitters (e.g., two) 10, 15 and a sensor 20 are shown disposed above a center closing elevator doorway 25. Each of the emitters 10, 15 may be any optical radiation source which can project a plane of light; for example, a pulsed laser with a narrow bandwidth may be used so that its emitted light is distinguishable from the background light of the surroundings. Each emitter 10, 15 is fitted with a cylindrical optical lens 30, or any other device which spreads the light through a wide angle in one dimension such that each emitter 10, 15 radiates a plane of light P1, P2. The emitter 10 is mounted along substantially the top center of the doorway 25 and angled to radiate a plane of light P1 toward the floor such that a floorline 40 is reflected where the plane of light P1 intersects the floor. The emitter 15 is mounted along substantially the top center of the doorway 25 and angled to radiate a plane of light P2 toward the floor such that a floorline 42 is reflected where the plane of light P2 intersects the floor. It should be understood by someone skilled in the art that a floor may be any surface which is capable of creating a floorline 40, 42 where the plane of light P1, P2 intersects the floor. Door edge lines 45 (shown in FIGS. 3,4) are reflected where the plane of light intersects the door edge E.

In FIGS. 1 and 2, a sensor 20, shown disposed above the doorway 25, may be any two dimensional sensor array sensitive to the radiation of the emitters 10, 15; for example, a charge coupled device ("CCD") may be used, fitted with a wide angle lens 17 or other light gathering device, so that the sensor 20 can monitor the door approach area. The sensor 20 also should be insensitive to radiation other than radiation from the emitters 10, 15; thus, e.g., an optical bandpass filter 18 is attached to the sensor 20 such that the sensor 20 only detects light near the wavelength of the light originating from the emitters 10, 15. The sensor 20 is disposed such that it is not located in either of the planes of light P1, P2 radiated from the emitters 10, 15. For simplification of the subsequent obstruction detection circuitry (shown in FIG. 6), the vertical and horizontal axes are interchanged by mounting the sensor on its side such that in looking at the doorway 25 from the hallway (as shown in FIG. 1) the top of the sensor 20 faces right. The emitters 10, 15 and the sensor 20 cooperate in a manner hereafter described.

Referring to FIG. 1, each emitter 10, 15 projects a plane of light P1, P2 downwardly from above the doorway 25 so as to provide obstruction detection for substantially the entire doorway 25 thickness. The plane of light P1 from the emitter 10 is used for sensing obstructions along the outside of the doorway 25 and the plane of light P2 from the emitter 15 is used to sense obstructions along the inside of the doorway 25. The sensor 20, located out of the planes of light P1, P2 monitors a field of view from above the doorway 25. In an unobstructed doorway 25 the sensor 20 detects the reflected floorlines 40, 42 and the door edge lines 45 (shown in FIGS. 3, 4). In an obstructed field of view, the sensor 20 detects a gap 55 (shown in FIG. 4) in the floorline(s) 40 and/or 42, and the door edge lines 45 (shown in FIGS. 3, 4), and additional line segments 60 (shown in FIG. 4) where the plane of light P1, P2 intersects the obstruction.

FIG. 3 is the field of view, corresponding to one of the floorlines 40, 42 (shown in FIG. 1), in an unobstructed plane of light P1, P2 (shown in FIG. 1) as observed by the sensor 20 (shown in FIG. 1). The horizontal and vertical axes are exchanged as a result of positioning the sensor 20 on its side. At the top and bottom of the field of view are door edge lines 45 due to the intersections of the light and the door edges E (shown in FIG. 1). In the middle of the field of view is a vertical line 50 which is the section of the floorline 40, 42 (shown in FIG. 1) that is in the field of view of the sensor 20.

FIG. 4 is the field of view, corresponding to one of the floorlines 40, 42 (shown in FIG. 1), in an obstructed plane of light P1, P2 (shown in FIG. 1) as observed by the sensor 20 (shown in FIG. 1). The vertical line 50 is the section of the floorline 40, 42 (shown in FIG. 1) that is in the field of view of the sensor 20. The gap 55 and the additional line segment 60 near the middle of the vertical line 50 represent an obstruction near the middle of the doorway 25. This additional line segment 60 due to the obstruction appears to fall to the side of the floorline 40 as a result of the sensor's 20 location out of the plane of light P1, P2. The sensor 20 transmits the video image in the standard RS-170 TV format to obstruction detection circuitry (shown in FIG. 6) which examines the pattern of line segments to determine the existence of an obstruction.

Figure 5:
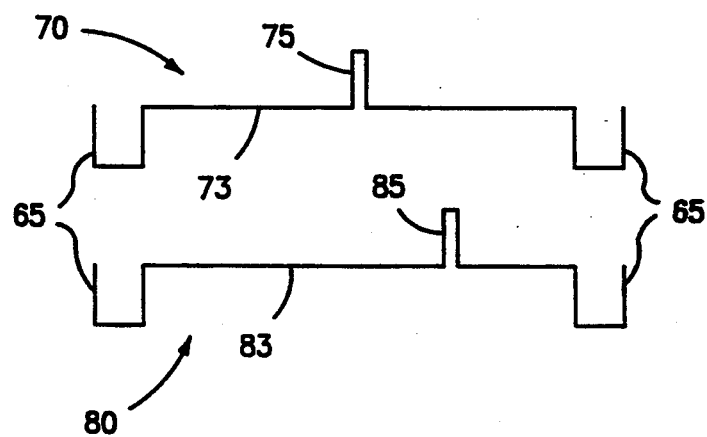
FIG. 5 shows the video signal output for two horizontal video lines of the sensor.

Shown in FIG. 5 is a video signal output from the sensor 20 for two horizontal video lines 70, 80. The video signals are shown as they might appear on an oscilloscope, with time as the horizontal axis and voltage as the vertical axis. A leading and a trailing lowgoing horizontal sync pulse 65 is shown bracketing the video information. In displaying the sensor's 20 output, more positive voltages represent brighter regions of the field of view.

The upper horizontal video line 70 comprises two horizontal sync pulses 65 bracketing a base line 73, which represents where the floorline 40, 42 or the door edge line 45 is not detected, and pulse 75 which represents a bright spot corresponding to the detection of the floorline 40, 42 or the door edge line 45. The lower horizontal video line 80 comprises two horizontal sync pulses 65 bracketing a base line 83, which represents where the floorline 40, 42 or the door edge line 45 is not detected, and a pulse 85 which represents a bright spot corresponding to the intersection of the plane of light P1, P2 and an obstruction. The difference in time, relative to the horizontal sync pulse 65, between the two bright spots is measured and used to indicate the presence of the obstruction. The decision making strategy is implemented in the following obstruction detection circuitry.

Figure 6:
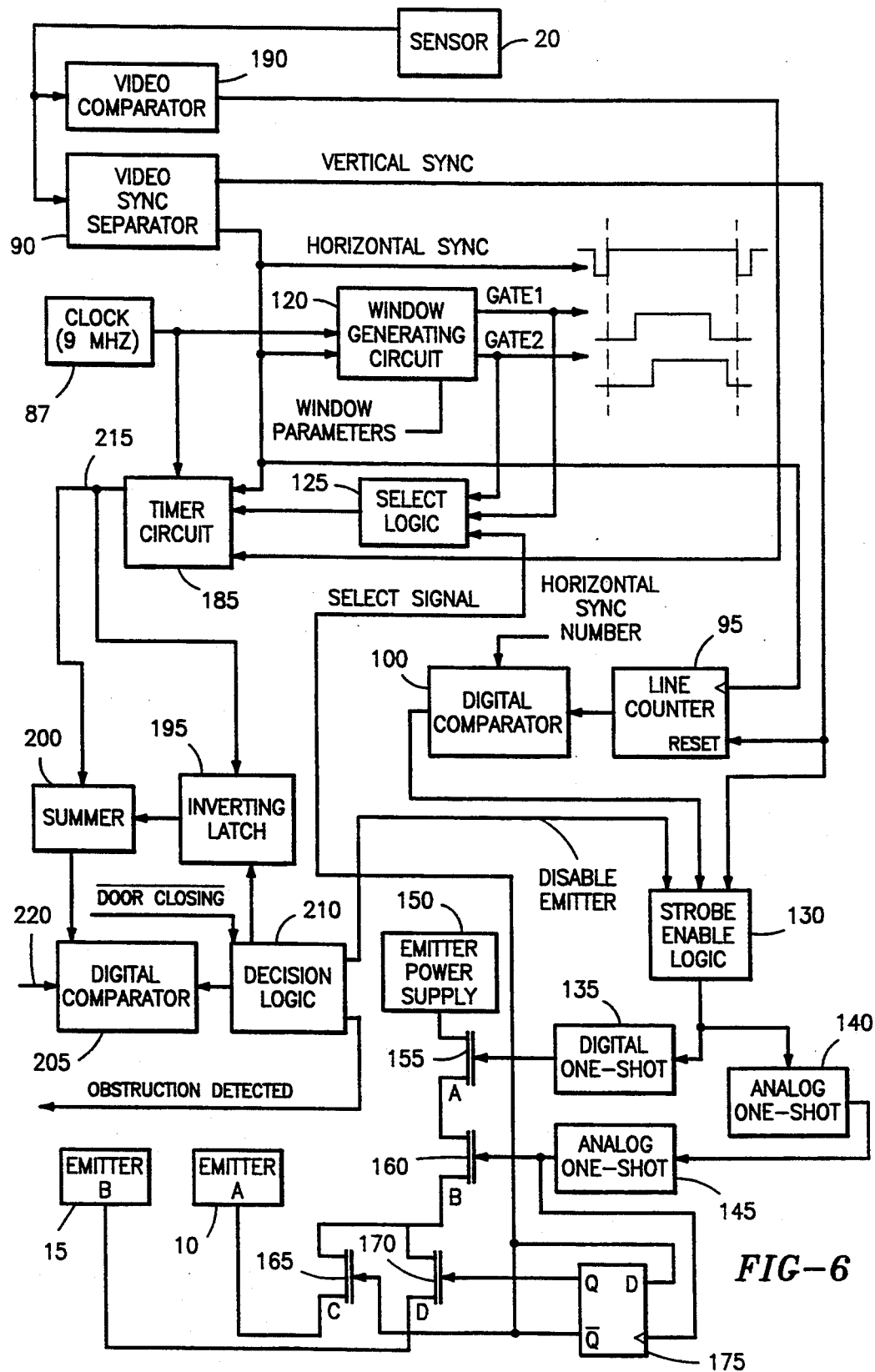
FIG. 6 is a block diagram of the obstruction detection circuitry.

Referring to FIG. 6, the obstruction detection circuitry provides several functions including emitter strobing circuitry for strobing the emitters 10, 15, detection circuitry for providing a means for determining whether an obstruction is present and synchronization circuitry for synchronizing the emitters 10, 15 and the obstruction detection circuitry with the sensor 20.

In FIG. 6, the synchronization circuitry provides the timing signals required by both the emitter strobe circuitry and the obstruction detection circuitry. The synchronization circuitry comprises a clock 87, a video sync separator 90, a line counter 95, a digital comparator 100, a window generating circuit 120, and a select logic circuit 125, all electrically connected as shown.

The video sync separator 90 is connected to the sensor 20 such that the video sync separator 90 derives vertical and horizontal sync signals from the RS-170 video signal transmitted from the sensor 20. A National Semiconductor LM1881 video sync separator may be used for this purpose. The sync signals, which include sync pulses, are used as timing signals for both the strobing circuitry and the detection circuitry. Further, to enhance the signal to noise ratio of the video output signal from the sensor 20, the synchronization circuitry uses the sync signals to synchronize the emitter strobing with the sensor shutter interval. The sensor shutter is actuated once for every vertical sync pulse but not at the same time. Thus, the horizontal sync signals are counted and used to set the strobing such that the strobing is synchronized with the shutter interval. The synchronization circuitry utilized by the strobing circuitry operates as follows.

The line counter 95, which is connected to both the horizontal and the vertical sync signals of the video sync separator 90, counts the horizontal sync pulses starting after each vertical sync pulse. The vertical sync signal is used as a reset by the line counter 95. The output of the line counter 95 is connected to the digital comparator 100 which compares the line counter's 95 output signal to a horizontal line number used to set the strobe synchronization timing to a particular horizontal line number. The output of the digital comparator 100 is connected to the strobe enable logic 130 of the strobing circuitry.

The strobing circuitry comprises strobe enable logic 130, a digital one-shot 135, a first analog one-shot 140, a second analog one-shot 145, an emitter power supply 150, four switches 155, 160, 165, 170 and a toggle flip-flop 175. The strobing circuitry cooperates as follows.

The output of the digital comparator 100 from the synchronization circuitry and the output from the video sync separator 90 which transmits the vertical sync signal are connected to inputs of the strobe enable logic 130. The strobe enable logic 130 uses the vertical sync signal to prevent the occurrence of more than one emitter strobe for each vertical sync pulse. Thus, if more than one output from the digital comparator 100 of the synchronization circuitry occurs per vertical sync pulse, only the first output will be used to strobe the emitters 10, 15. The strobe enable logic 130 also is connected to an output of a decision logic 210 such that the decision logic 210 transmits the disable emitter signal to the strobe enable logic 130 when an obstruction is detected. The disable emitter signal causes the strobe enable logic 130 to suspend strobing the emitters 10, 15 for a determined delay time. After this determined delay time the emitters 10, 15 are enabled so as to allow the optical obstruction detector to determine if the obstruction remains present. Thus, the strobe enable logic 130 provides one output signal per vertical sync pulse when a strobe signal is transmitted by the digital comparator 100 from the synchronization circuitry if there are no obstructions detected or after a determined delay time after an obstruction is detected.

The output signal of the strobe enable logic 130 is connected to the inputs of both the digital one-shot 135 and the first analog one-shot 140 of the strobe circuitry. The digital one-shot 135 is used to set the strobe pulse width. The first analog one-shot 140, which provides a pulse signal that defines the period between strobing and prevents premature retriggering of the second analog one-shot 145, is connected to the second analog one-shot 145, which sets the strobe pulse width similarly to the digital one-shot 135, such that the analog one-shots 140 and 145 are connected in parallel with the digital one-shot 135. The output of the digital one-shot 135 is connected to the switch A 155 and the output of the analog one-shots 140, 145 is connected to the switch B 160 such as to provide redundant switching for fail-safe operation of the emitter strobing. If either the switch A 155 or the switch B 160 fails, (e.g., by attempting to provide power to the emitters 10, 15 at an undesired time), the other switch that has not failed 155 or 160 restricts the time the emitters 10, 15 will receive the power. The emitter power supply 150 provides continuous current limiting by sourcing sufficient current for pulsed operation but not enough for continuous emitter operation; this provides protection against continuous emitter operation. The emitter power supply 150 is connected in series with the switch A 155 which is connected in series with the switch B 160 which in turn is connected in series to the parallel combination of the switch C 165 and the switch D 170. When the switch A 155 and the switch B 160 are both closed, power is supplied to both the switch C 165 and the switch D 170. The switch C 165 is connected to emitter A 10 such that when power is supplied to switch C 165, and switch C 165 is closed, power is supplied to the emitter A 10. The switch D 170 is connected to emitter B 15 such that when power is supplied to switch D 170 and switch D 170 is closed, power is supplied to emitter B 15. The toggle flip-flop 175, which is clocked by the output of the second analog one-shot 145, is connected to switches C 165 and D 170 such that switch C 165 and switch D 170 provide power to emitter A 10 and emitter B 15 one-hundred and eighty degrees out of phase with respect to each other thus providing alternate protection of the inner and outer door edges. This alternate protection scheme allows for protecting both the inner and outer doorway 25 while timesharing the obstruction detection logic. The synchronization circuitry that supplies timing signals for the detection circuitry is realized as follows.

The window generating circuit 120 provides two output signals gate1, gate2, each corresponding to the timing of one of the emitters 10, 15. These gating signals gate1, gate2 mask undesired signals, such as sync signals, so that the undesired signals are not falsely interpreted as bright spots created by the emitters 10, 15. Each gating signal gate1, gate2 creates a gating interval when the respective gating signal gate1, gate2 is a logic "1". The window generating circuit 120 includes internal counters and uses the clock 87 to create these two gating signals gate1, gate2 during each horizontal video line. The gating signals can be adjusted to compensate for the physical environment of the optical obstruction detector and/or for the sync signals by means of setting the window parameters. Gate1 and gate2 are both connected to inputs of the select logic 125. The select logic 125 also receives a select signal from the output of the toggle flip-flop 175 which is used to select which gate signal to transmit to a timer circuit 185 of the detection circuitry. For example, if emitter A 10 is strobed then the select logic 125 will transmit the gate1 to the timer circuit 185. If emitter B 15 is strobed then the select logic 125 will transmit the gate2 to the timer circuit 185. The detection circuitry is realized as follows.

The detection circuitry comprises a video comparator 190, a timer circuit 185, an inverting latch 195, a summer 200, a digital comparator 205 and decision logic 210, all electrically connected as shown. The video comparator 190 is connected to the sensor 20 such that the video comparator 190 receives the RS-170 video signal transmitted by the sensor 20. The video comparator 190 is edge sensitive and changes state on any large and sudden transitions from dark (low) to bright (high) in the video signal. This allows the video comparator 190 to detect bright spots, created by the emitters 10, 15, in the sensor's 20 field of view. This approach is relatively insensitive to any constant or gradually changing average background lighting level but is very sensitive to the floorlines 40, 42 created by the emitters 10, 15.

The output signal of the video comparator 190 is transmitted to the timer circuit 185. The timer circuit 185, using counters 235 (shown in FIG. 8) and the clock 87, determines the time of the occurrence of bright spots in the output signal from the video comparator 190 relative to the horizontal sync signal. The output signal from the select logic 125 is used by the timer circuit 185 to mask unwanted signals, such as the sync signals, from the output of the video comparator 190. The timer circuit 185 transmits a timing signal 215, which corresponds to occurrence times of the bright spots, to the inverting latch 195 and the summer 200.

The inverting latch 195 is used to store a previous timing signal 215 which is then inverted and transmitted to the summer 200. The summer 200 adds the present timing signal 215 to the inverse of the previous timing signal 215. This provides a one's complement subtract and allows the digital comparator 205 to determine if the present timing signal 215 has increased, decreased, or remained the same as compared to the previous timing signal 215. The output of the summer 200 is then transmitted to the digital comparator 205 which determines if the change of the present timing signal 215, as compared to the previous timing signal 215, is beyond a set upper or lower threshold. The upper and lower threshold can be assigned by setting the sensitivity input 220 of the digital comparator 205. The output signal of the digital comparator 205 is transmitted to the decision logic 210 which determines if an obstruction is present.

The decision logic 210 operates as follows. If the digital comparator 205 determines that the present timing signal 215 is larger, beyond an upper threshold set by the digital comparator 205, as compared to the previous timing signal 215 then the decision logic 210 determines that the bright spot, as viewed by the sensor 20, has moved to the left. If the digital comparator 205 determines that the present timing signal 215 is smaller, beyond a lower threshold set by the digital comparator 205, as compared to the previous timing signal 215 then the decision logic 210 determines that the bright spot, as viewed by the sensor 20, has moved to the right. If the output signal from the digital comparator 210 is between the two thresholds then the logic determines that the bright spot, as viewed by the sensor 20, has not moved. The inverting latch 195 is clocked by the decision logic 210 and the present timing signal 215 is retained in the latch if the bright spot has moved either in the left or right direction. The inverting latch 195 is not clocked if the decision logic 210 has determined that the bright spot has not moved; this allows the detection circuitry to detect incremental changes in the movement of the bright spot.

If the bright spot, as viewed by the sensor 20, first moves to the right then to the left within the interval between two vertical sync pulses, the detection logic concludes that an obstruction is present. If an obstruction is detected then the decision logic 210 transmits an obstruction detected signal to a door control system 320 (shown in FIG. 7), and a disable emitter signal to the strobe enable logic 130.

Figure 7:
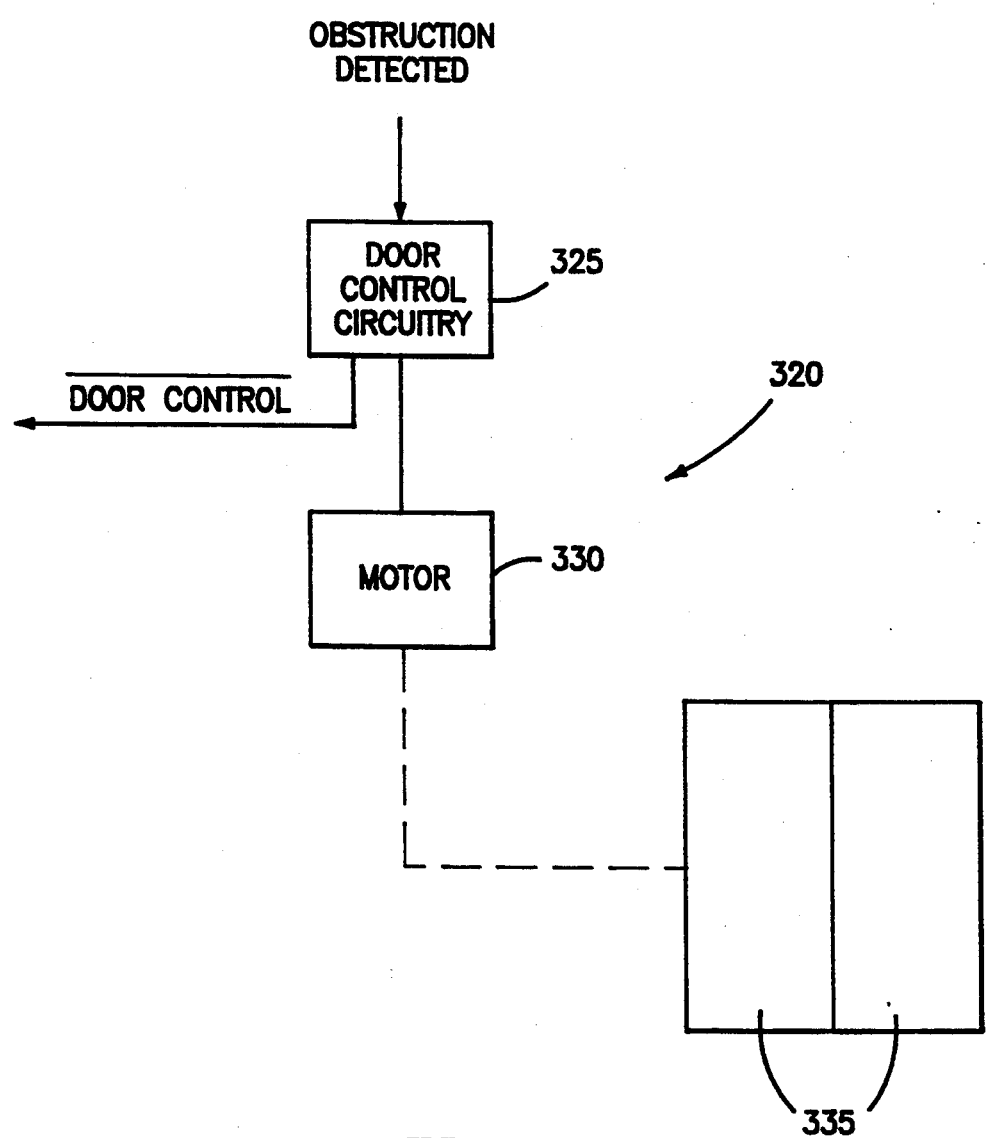
FIG. 7 shows a door control mechanism

FIG. 7 shows a door control system 320 comprising door control circuitry 325, a motor 330, and two doors 335, all of which are well known in the art. The door control circuitry 325 and the motor 330 cooperate to control the operation of the doors 335. The obstruction detected signal is transmitted for a determined time and allows the door control system 320 to take the proper action in response to the obstruction, such as reopen the doors 335.

Referring to FIG. 6, the disable emitter signal allows the strobe enable logic 130 to suspend the emitter strobing for a determined delay time after which the emitters 10 and 15 are strobed again so as to determine if an obstruction remains present. If it is determined that the obstruction remains present or another obstruction is present, the decision logic 210 continues to transmit the obstruction detected signal to the door control system 320 which allows the door control system 320 to continue to take the proper action in response to the obstruction, such as cause the doors to remain open. Thus, the determined delay time for suspending the emitter strobing is smaller than the determined time for the obstruction detected signal so that obstruction detection can be resumed before the door control system 320 resumes closing the doors 335.

Figure 8:
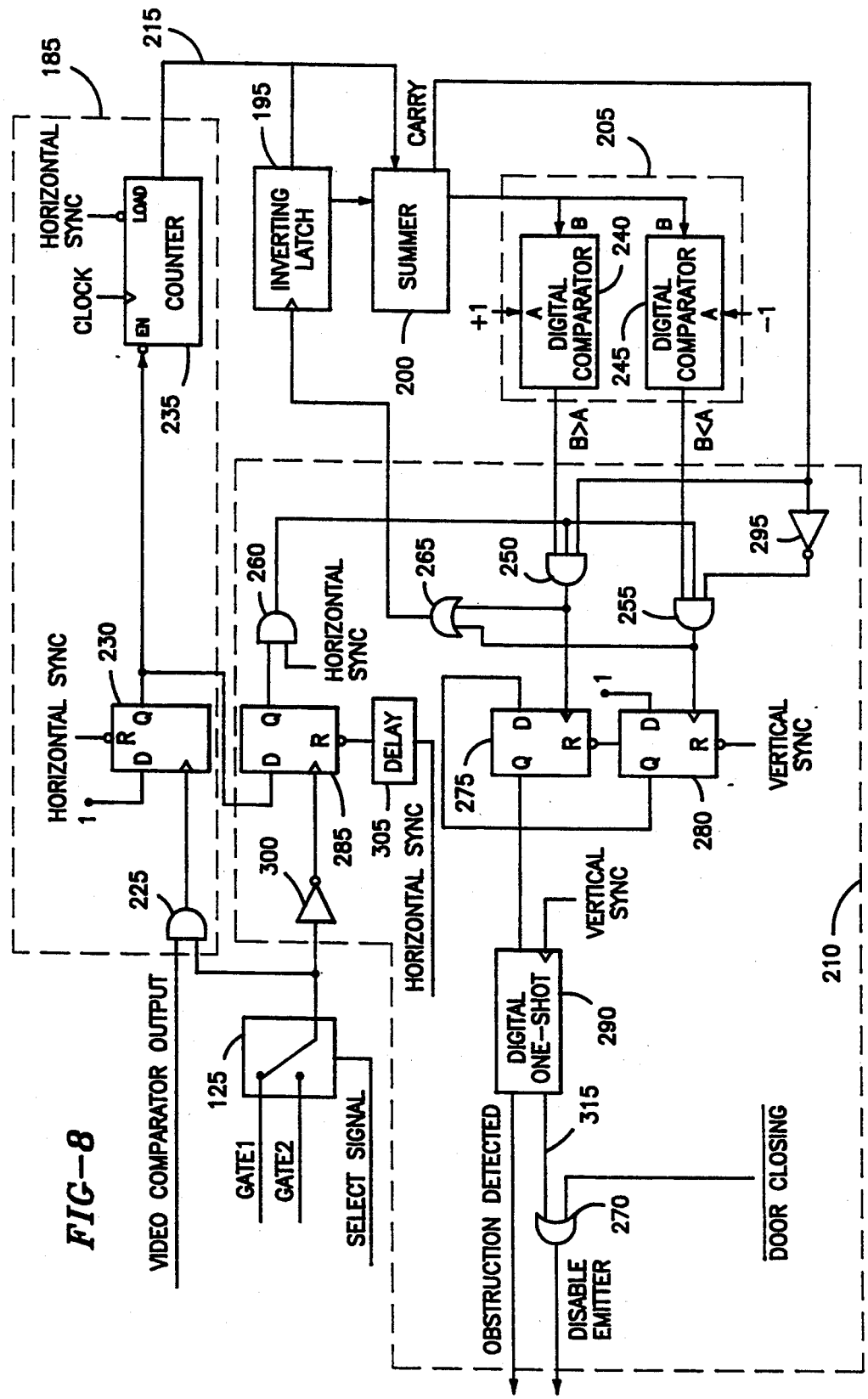
FIG. 8 is a schematic representation of the detection circuitry.

FIG. 8 is a preferred embodiment of the detection circuitry including the timer circuit 185, the inverting latch 195, the summer 200, digital comparator 205, and the decision logic 210. The select logic 125 of the synchronization circuitry is also shown.

The timer circuit 185 comprises an AND gate 225, a flip-flop 230, and a counter 235, all electrically connected as shown. The counter is triggered to begin counting down by the horizontal sync pulse. The video comparator output along with the select logic output are connected to the AND gate 225 such that when both outputs are a logic "1" the flip-flop 230 is clocked. The flip-flop 230, which is reset on each horizontal sync pulse, transmits a logic "1" to the enable (using negative logic) of the counter 235. The logic "1" from the flip-flop's 230 output corresponds to a bright spot occurring within the window created by the gate signals gate1, gate2; thus, when the counter 235 is disabled by the logic "1" on the counter enable, the counter 235 stops counting down and provides the timing signal 215 to the inverting latch 195 and the summer 200, which cooperate as described above. The first OR gate 265 clocks the inverting latch 195 when it is determined that the bright spot has moved either to the right or the left as described above.

A first digital comparator 240 and a second digital comparator 245, which as described above set the upper and lower thresholds, represent the digital comparator 205 shown in FIG. 6. The output of the first digital comparator 240, which represents bright spot movements to the left, and the output of the second digital comparator 245, which represents bright spot movements to the right, are connected to the decision logic 210.

The decision logic 210 comprises a first AND gate 250, a second AND gate 255, a third AND gate 260, a first OR gate 265, a second OR gate 270, a first flip-flop 275, a second flip-flop 280, a third flip-flop 285, a digital one-shot 290, a first inverter 295, a second inverter 300, and a delay 305, all electrically connected as shown.

The first AND gate 250 and the second AND gate 255 provide clock signals to the first flip-flop 275 and the second flip-flop 280 respectively. Clocking of the first flip-flop 275 represents a movement of the bright spot to the left and clocking of the second flip-flop 280 represents a movement of the bright spot to the right. If the second flip-flop 280 is clocked, and subsequently, but before the next vertical sync pulse, the first flip-flop 275 is clocked, then the first flip-flop 275 triggers the digital one-shot 290 which in turn provides the obstruction detected signal and an output signal 315 to the second OR gate 270. The second OR gate 270 provides the disable emitter signal by performing a logical OR function on the output signal 315 of the digital one-shot 290 and the doorclosing NOT signal transmitted from the door control circuitry 325 (shown in FIG. 7). The doorclosing NOT signal is a logic "1" when the door 335 (shown in FIG. 7) is not closing, and a logic "0" otherwise. Thus, the second OR gate 270 transmits the disable emitter signal to the strobe enable logic 130 (shown in FIG. 6) when either the doorclosing NOT signal is a logic "1", representing that the door 335 (shown in FIG. 7) is not closing, or when the digital one-shot 290 transmits the output signal 315. The output signal 315 is transmitted for the determined delay time, as describe above, such that the determined delay time is shorter than the transmission time of the obstruction detected signal thus allowing for obstruction detection prior to resuming the closing of the doors 335 (shown in FIG. 7).

The second inverter 300, the third flip-flop 285, the delay 305, and the third AND gate 260 cooperate to ensure that detection logic 210 is enabled if a bright spot is detected during the gating interval created by either the gate1 signal or the gate2 signal. The output of the select logic 125 is connected to the input of the second inverter 330 and the output of the second inverter is connected to the clock of the third flip-flop 285. The input of the third flip-flop 285 is connected to the output of the flip-flop 230 of the timer circuitry 185. Thus, the third flip-flop 285 is clocked on the falling edge of either the gate1 signal or the gate2 signal such that the third flip-flop 285 provides an output corresponding to the existence of a bright spot during the gate1 or gate2 interval. The output of the third flip-flop 285 is connected to an input of the third AND gate 260. The horizontal sync signal is also connected to an input of the third AND gate 260 such that the output of the third AND gate is a logic "1" when both the horizontal sync signal and the output of the third flip-flop 285 is a logic "1". The output of the third AND gate is connected to inputs of the first AND gate 250 and the second AND gate 255 such that the output signals of the digital comparator 205 will be transmitted to the first flip-flop 275 and the second flip-flop 280 only when a bright spot was detected during the gate1 or gate2 interval.

Although the invention has been shown and described with respect to a best mode embodiment thereof, it should be understood by those skilled in the art that various other changes, omissions and additions in the form and detail thereof may be made therein without departing from the spirit and scope of the invention. For example, the aforementioned circuitry functions may be implemented by other various electronic circuitry arrangements such as, but not limited to, microprocessors cooperating with software.

We claim:

1. A method for detecting a presence of an obstruction, comprising:
   (a) emitting a plane of light toward a floor such that a light pattern having a floorline created at an intersection of said plane of light and said floor is provided;
   (b) detecting said light pattern with a sensor;
   (c) providing a sensor output signal from said sensor in response to said light pattern; and
   (d) determining from said sensor output signal a presence of said obstruction within said plane of light, so that said obstruction in said plane of light causes a change in said light pattern thereby causing a change in said sensor output signal.

2. A method for detecting a presence of an obstruction as recited in claim 1, further comprising:
   (a) generating an obstruction detected signal in response to determining that said obstruction exists in said plane of light; and
   (b) controlling an operation of a door responsive to said obstruction detection signal.

3. A method for detecting a presence of an obstruction as recited in claim 1, further comprising:
   (a) generating an obstruction detected signal in response to determining that said obstruction exists in said plane of light; and
   (b) controlling an operation of an elevator door responsive to said obstruction detection signal.

4. A method for detecting a presence of an obstruction as recited in claim 1, wherein said emitting step comprises two planes of light radiated toward the floor.

5. A method for detecting a presence of an obstruction as recited in claim 1, wherein said light pattern of said detecting step further comprises a door edge line.

6. A method for detecting a presence of an obstruction as recited in claim 1, wherein said light pattern of said detecting step further comprises a reflection of said obstruction.

7. A method for detecting a presence of an obstruction in an opening, comprising:
   (a) emitting a plane of light toward a floor and across an opening such that a floorline is created at an intersection of said plane of light and said floor;
   (b) detecting said floorline with a sensor;
   (c) providing a sensor output signal from said sensor in response to said floorline; and
   (d) determining from said sensor output signal a presence of an obstruction within the plane of light, so that said obstruction causes a change in said floorline.

8. A device for the detection of an obstruction in a region swept by a closing door, comprising:
   (a) an emitter for radiating a plane of light toward a floor such that a light pattern having a floorline created at an intersection of said plane of light and said floor is provided;
   (b) a sensor for producing a sensor output signal in response to detecting said light pattern; and
   (c) a means for analyzing said sensor output signal for detection of said obstruction in said region swept by said closing door.

9. A device for the detection of an obstruction in a region swept by a closing door as recited in claim 8, further comprising:
   (a) an obstruction detected signal responsive to said detection of said obstruction for controlling the operation of said closing door.

10. A device for the detection of an obstruction in a region swept by a closing door as recited in claim 8, wherein said emitter comprises two emitters.

11. A device for the detection of an obstruction in a region swept by a closing door as recited in claim 8, further comprising:
   (a) an optical lens mounted to said emitter for radiating said plane of light;
   (b) an optical lens mounted to said sensor for gathering said plane of light to said sensor;
   (c) a filter mounted to said sensor for attenuating sources of energy other than said plane of light.

12. A device for the detection of an obstruction in a region swept by a closing door as recited in claim 8, wherein said light pattern of said emitter further comprises a door edge line.

13. A device for the detection of an obstruction in a region swept by a closing door as recited in claim 8, wherein said light pattern of said emitter further comprises a reflection of said obstruction.

14. A device for the detection of an obstruction in a region swept by a closing door as recited in claim 8, further comprising an obstruction detected signal responsive to said detection of said obstruction for controlling the operation of an elevator door.

* * * * *